US007860938B2

(12) United States Patent
Youn et al.

(10) Patent No.: US 7,860,938 B2
(45) Date of Patent: Dec. 28, 2010

(54) AGENT PLATFORM, MULTI AGENT SYSTEM, AND MESSAGE TRANSMITTING/RECEIVING METHOD THEREOF

(75) Inventors: Hee Yong Youn, Gyeonggi-do (KR); Yang Seok Yoon, Gyeonggi-do (KR)

(73) Assignee: Sungkyunkwan University Foundation For Corporate Collaboration, Gyeonggi-Do (KR)

(*) Notice: Subject to any disclaimer, the term of this patent is extended or adjusted under 35 U.S.C. 154(b) by 318 days.

(21) Appl. No.: 12/028,613

(22) Filed: Feb. 8, 2008

(65) Prior Publication Data

US 2009/0106384 A1 Apr. 23, 2009

(30) Foreign Application Priority Data

Jul. 2, 2007 (KR) ..................... 10-2007-0066002

(51) Int. Cl.
*G06F 15/16* (2006.01)

(52) U.S. Cl. ...................................... 709/207; 709/202

(58) Field of Classification Search ......... 709/204–207, 709/238–244
See application file for complete search history.

(56) References Cited

U.S. PATENT DOCUMENTS

| | | | | |
|---|---|---|---|---|
| 4,945,471 | A * | 7/1990 | Neches | 709/252 |
| 5,963,731 | A * | 10/1999 | Sagawa et al. | 703/6 |
| 6,832,245 | B1 * | 12/2004 | Isaacs et al. | 709/206 |

OTHER PUBLICATIONS (FIPA 98 Specification Part 1, Oct. 23, 1998, FIPA; http://www.fipa.org/specs/fipa00002/OC00002.pdf).*
(FIPA Communicative Act Library Specification; Copyright 2000; FIPA; http://www.fipa.org/specs/fipa00037/XC00037H.html).*

* cited by examiner

*Primary Examiner*—Joseph E Avellino
*Assistant Examiner*—Afshawn Towfighi
(74) *Attorney, Agent, or Firm*—Rabin & Berdo, P.C.

(57) ABSTRACT

Provided are an agent platform, a multi agent system, and a message transmitting/receiving method thereof. The message transmitting/receiving method for a multi agent platform including a first agent platform for managing at least one of a first agent and a second agent and at least one of a second agent platform for managing at least one of a third agent, includes: receiving a plurality of messages from the first agent at the first agent platform; assigning a priority to the received message according to a message type of the message at the first agent platform; and transmitting the message to the second agent or the second agent platform according to the priority.

10 Claims, 6 Drawing Sheets

AGENT PLATFORM, MULTI AGENT SYSTEM, AND MESSAGE TRANSMITTING/RECEIVING METHOD THEREOF

The present application claims priority under 35 U.S.C. 119 to Korean Patent Application No. 10-2007-0066002 (filed on Jul. 2, 2007), which is hereby incorporated by reference in its entirety.

TECHNICAL FIELD

Embodiments relates to an agent platform, a multi agent system, and a message transmitting/receiving method thereof for improving the operational efficiency of agents by assigning a priority to messages that are transmitted/received between agents in a multi agent system and transmitting messages according to the assigned priority.

BACKGROUND

As a ubiquitous computing environment has been receiving attention, many researches about adaptive and self-growing agent platforms have been actively progressed. Ubiquitous means being everywhere at the same time. That is, a ubiquitous computing environment denotes an environment that allows users to freely access a network without having temporal and spatial restrictions.

In order to realize the ubiquitous computing environment, it is essential to develop various technologies, for example, technologies for making devices smaller and light-weighted, and a technology for distribution. It is also necessary to embody user friendly interfaces in various forms to recognize facial expression, actions, voices, and body conditions. In order to provide services that a user wants, it is necessary to provide agents that collect diverse information from sensors and computers disposed at various locations and recognize states and conditions of a user and a peripheral environment thereof based on the collected diverse information.

The agents have abilities to effectively perform operations and solve problems by themselves in dynamic and open environment.

An agent in the multi agent system can be defined as a computer program working cooperatively with other agents in dynamic and open environment. An agent autonomously executes its operations and solves the problems. In order to provide more complicated services than independent application programs, an agent solves a problem by working cooperatively with other agents.

Since the typical characteristics of agents are autonomy, intelligence, mobility, and social ability, collaboration of agents may be made without user intervention.

The agent platform needs an agent communication language (ACL) to allow collaboration between the agents registered in different agent platforms and supports community computing by dynamically creating and destroying agent groups using the agent management and discovery system.

Java agent development framework (JADE) is a representative agent platform developed by Telecom Italia Lab which conforms to the FIPA specification which is a foundation for Intelligent Physical Agents.

Supporting the development of MAS is the main goal of JADE. Each agent is a peer that potentially needs to initiate a communication with other agents as well as capable of providing services to the rest of agents.

The communication architecture of the agent platform offers flexible and efficient messaging. It includes two main products; a FIPA-compliant agent platform and package used to develop Java agents.

FIPA, the international standardization group for agents, presents an agent communication language (ACL), which is used for communication between agents. The FIPA ACL ensures interoperability through a macro. The FIPA ACL provides processes defined as a set of communicative acts.

FIPA is an IEEE computer society standard for supporting an agent-base technology and interoperability with other systems. If two or more systems use different technologies to achieve a goal, it is necessary to identify the common characteristics of various approaches. FIPA has shown a solution for this problem.

The primary focus of FIPA is to create semantically meaningful message exchange between the agents which may be using different messaging transport ACT, or content languages. A FIPA ACL message contains a set of one or more message parameters.

TABLE 1

| Category of Parameters | Parameter |
|---|---|
| Type of communicative acts | Performative |
| Participant in communication | sender, receiver, reply-to |
| Content of message | Content |
| Description of content | language, encoding, ontology |
| Control of conversation | protocol, conversation-id, reply-with, in-reply-to, reply-by |

As shown in Table 1, all sets of message parameters included in FIPA ACL are prepared for communication between agents.

The performative parameter denotes the type of the communicative act of the ACL message. The participant as a sender, receiver, and reply-to parameter denotes the identity of the participants in the message or the subsequent messages. Also, it is possible to detect a message type by determining which operation a message is made for through analyzing the content of message. Furthermore, it is possible to detect a language of contents, an encoding scheme, and an otology through description of content. Moreover, it is possible to detect a protocol, a conversation progressing order (conversation-id), whether an agent receives a message or not (reply-with), and a time of receiving a replay message at a transmit agent (in-reply-to) through control of conversation.

FIPA dose not specify any mechanism for handling the condition, and thereof the implementations omitting some message parameters are not guaranteed to operate properly.

FIPA indicates the communicative act expressed by a library such as Accept Proposal, Agree, Cancel, Call for Proposal, Confirm, Disconfirm, Failure, Inform, Inform If, Inform Ref, Not Understood, Propagate, Propose, Proxy, Query If, Query Ref, Refuse, Reject Proposal, Request, Request When, Request Whenever, and Subscribe.

Agents communicate with each other through exchanging messages using one of two following communication types.

First, an agent directly requests a necessary service to another agent in the same platform or a different platform.

Second, request and reply are made through a broker agent as shown in FIG. 1.

As shown in FIG. 1, each of two agent platforms 110 and 120 includes a plurality of agents 111 and 112. Each of the agents 111 and 122 transmits/receives a message through a broker agent 121. The second communication type provides effective message communication by reducing the number of agents transmitting/receiving messages. As described above, one of the most important requirements of the multi agent system is to support effective message communication between agents.

SUMMARY

Embodiments have been proposed to provide an agent platform, a multi agent system, and a message transmitting/receiving method thereof for improving operational efficiency of an agent by assigning a priority to a message transmitted/received between agents at an agent platform and transmitting messages according to the assigned priority.

In order to solve the above problems, embodiments provide a method for manufacturing a carbon nano tube electrode supported with.

Embodiments provide a message transmitting/receiving method for a multi agent platform including steps of: a) at the first agent platform, receiving a plurality of messages from the first agent; b) at the first agent platform, assigning a priority to the received message according to a message type of the message; and c) transmitting the message to the second agent or the second agent platform according to the priority.

The step b) may include assigning a higher priority to a message having a high transmitting/receiving frequency of a message transmitted between the first agent and the second agent or the first agent and the third agent than a message having a low transmitting/receiving frequency for messages having identical priorities which are assigned according to the message type.

The step b) may further include assigning a higher priority to a message received at first at the first agent platform than other message received later for messages having identical priorities assigned according to the transmitting/receiving frequency and the message type.

The message may be classified into: a directive message accompanying with a message for giving an instruction to the second agent or the third agent by the first agent and a replay message; an assertive message for the first agent to provide information to the second agent or the third agent; a permissive/prohibitive message for the first agent to inform the second agent or the third agent of approval or disapproval, wherein in step b), a higher priority is assigned in an order of the directive message, the assertive message, and the permissive/prohibitive message.

The message may be composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

Embodiments also provide a message transmitting/receiving method for a multi agent platform including the steps of d) at the first agent platform, receiving a plurality of messages from the first agent; e) comparing a first message processing amount for processing messages in the first agent platform and a second message processing amount for processing messages in the second agent platform; f-1) at the first agent platform, assigning a priority to a message according to a message type of the message when the first message processing amount is smaller than the second message processing amount; f-2) transmitting messages sequentially to the second agent or the second agent platform according to the priority assigned in the assigning a priority to a message according to a message type; g-1) transmitting the messages to the second agent or the second agent platform based on an order of receiving the messages at the first agent platform when the first processing amount is larger than the second processing amount; g-2) at the second agent platform, assigning a priority to the messages transmitted from the first agent platform based on the message type; and g-3) sequentially transmitting the messages according to the priority assigned in the step g-2) to the message transmitted from the first agent platform.

The step f-1) may further include assigning a higher priority to a message having a high transmitting/receiving frequency between the first agent and the second agent and between the first agent and the third agent for messages having identical priorities assigned according to the message type The step f-1) may further include assigning a higher priority to a message received earlier at the first agent platform than a message received later for messages having identical priorities assigned according to the message type and the message transmitting/receiving frequency.

The step g-2) may further include assigning a higher priority to a message having a high transmitting/receiving frequency between the first agent and the third agent for messages having identical priority assigned according to the message type.

The step g-2) may further include assigning a higher priority to a message received earlier at the second agent platform than a message received later at the second agent platform.

The message may be classified into: a directive message accompanying with a message for giving an instruction to the second agent or the third agent by the first agent and a replay message; an assertive message for the first agent to provide information to the second agent or the third agent; a permissive/prohibitive message for the first agent to inform the second agent or the third agent of approval or disapproval, wherein in the steps f-1) and g-2) a higher priority is assigned in an order of the directive message, the assertive message, and the permissive/prohibitive message.

The message may be composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

Embodiments also provide a multi agent system having a plurality of agent platforms, including: a first agent platform for managing at least one of a first agent and a second agent, receiving messages from the first agent, and transmitting the message to the second agent or another agent platform; and a second agent platform for managing at least one of a third agent and transmitting a message transmitted from the first agent platform to the third agent, wherein the first agent platform assigns a priority to the message according to a message type of the message and transmits the messages sequentially to the second agent or the second agent platform according to the assigned priority, and wherein the second agent platform assigns a priority to the messages in an order of receiving the messages and sequentially transmits the messages to the third agent according to the assigned priority.

The first agent platform may assign a higher priority to a message having a high transmitting/receiving frequency between the first agent and the second agent or the first agent and the third agent for messages having identical properties assigned according to the message type.

The first agent platform may assign a higher priority to a message received earlier at the first agent platform than a message received later for messages having identical properties assigned according to the message type.

The message may be classified into: a directive message accompanying with a message for giving an instruction to the second agent or the third agent by the first agent and a replay message; an assertive message for the first agent to provide information to the second agent or the third agent; a permissive/prohibitive message for the first agent to inform the second agent or the third agent of approval or disapproval, wherein in assigning a priority according to the message type at the first and second agent platforms, a higher priority is assigned in an order of the directive message, the assertive message, and the permissive/prohibitive message.

The message may be composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

Embodiments also provide a multi agent system having a plurality of agent platform, including: a first agent platform for managing at least one of a first agent and a second agent, receiving messages from the first agent, and transmitting the messages to the second agent or another agent platform; and a second agent platform for managing at least one of a third agent, and transmitting the messages transmitted from the first agent platform to the third agent, wherein the first agent platform assigns a priority to the messages transmitted from the first agent according to a message type of the messages and transmitting the messages to the second agent or the second agent platform when a first message processing amount for processing messages in the first agent platform is smaller than a second message processing amount for processing messages in the second agent platform, and the second agent platform transmits the messages transmitted from the first agent platform to the third agent according to an order of transmitting the messages, and wherein the first agent platform transmits the messages transmitted from the first agent to the second agent or the second agent platform according to an order of transmitting the messages at the first agent platform and the second agent platform assigns a priority to the messages transmitted from the first agent platform according to a message type of the messages and sequentially transmits the messages to the third agent according to the assigned priority when the first processing amount is larger than the second processing amount.

When a first processing amount for processing messages in the first agent platform is smaller than a second processing amount for processing messages in the second agent platform, the first agent platform may assign a higher priority to a message having a high transmitting/receiving frequency between the first agent and the second agent or between the first agent and the third agent for messages having the same priority assigned according to the message type.

When a first processing amount for processing messages in the first agent platform is smaller than a second processing amount for processing messages in the second agent platform, the first agent platform may assign a higher priority to a message received earlier at the first agent platform than a message received later for messages having identical properties assigned according to the message type.

When a first processing amount for processing messages in the first agent platform is larger than a second processing amount for processing messages in the second agent platform, the second agent platform may assign a higher priority to a message having a high transmitting/receiving frequency between the first agent and the second agent or between the first agent and the third agent for messages having the same priority assigned according to the message type.

When a first processing amount for processing messages in the first agent platform is larger than a second processing amount for processing messages in the second agent platform, the second agent platform may assign a higher priority to a message received earlier at the first agent platform than a message received later for messages having identical properties assigned according to the message type.

The message may be classified into: a directive message accompanying with a message for giving an instruction to the second agent or the third agent by the first agent and a replay message; an assertive message for the first agent to provide information to the second agent or the third agent; a permissive/prohibitive message for the first agent to inform the second agent or the third agent of approval or disapproval, wherein in assigning a priority according to the message type at the first and second agent platforms, a higher priority is assigned in an order of the directive message, the assertive message, and the permissive/prohibitive message.

The message may be composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

Embodiments also provide an agent platform for managing a plurality of agents, wherein the agent platform receives a plurality of messages from a first agent, assigns priorities to the received messages according to a message type thereof, and sequentially transmits the messages to a second agent according to the assigned priority.

A higher priority may be assigned according to a high transmitting/receiving frequency between the first agent and the second agent for messages having identical priorities assigned according to the message type.

A higher priority may be assigned to a message received earlier at the agent platform than a message received later for messages having identical priorities assigned according to the message type.

The message may be classified into: a directive message accompanying with a message for giving an instruction to the second agent or the third agent by the first agent and a replay message; an assertive message for the first agent to provide information to the second agent or the third agent; a permissive/prohibitive message for the first agent to inform the second agent or the third agent of approval or disapproval, wherein in assigning a priority according to the message type at the first and second agent platforms, a higher priority is assigned in an order of the directive message, the assertive message, and the permissive/prohibitive message.

The message may be composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

DRAWINGS

DESCRIPTION

Hereinafter, an agent platform, a multi agent system, and a message transmitting/receiving method thereof according to embodiments of the present invention will be described in detail with reference to the accompanying drawings.

The multi agent system according to embodiments includes a plurality of agent platforms. Hereinafter, the multi agent system will be described. While describing the multi agent system, assigning a priority in an agent platform will be described together without describing an agent platform separately.

Figure 1:
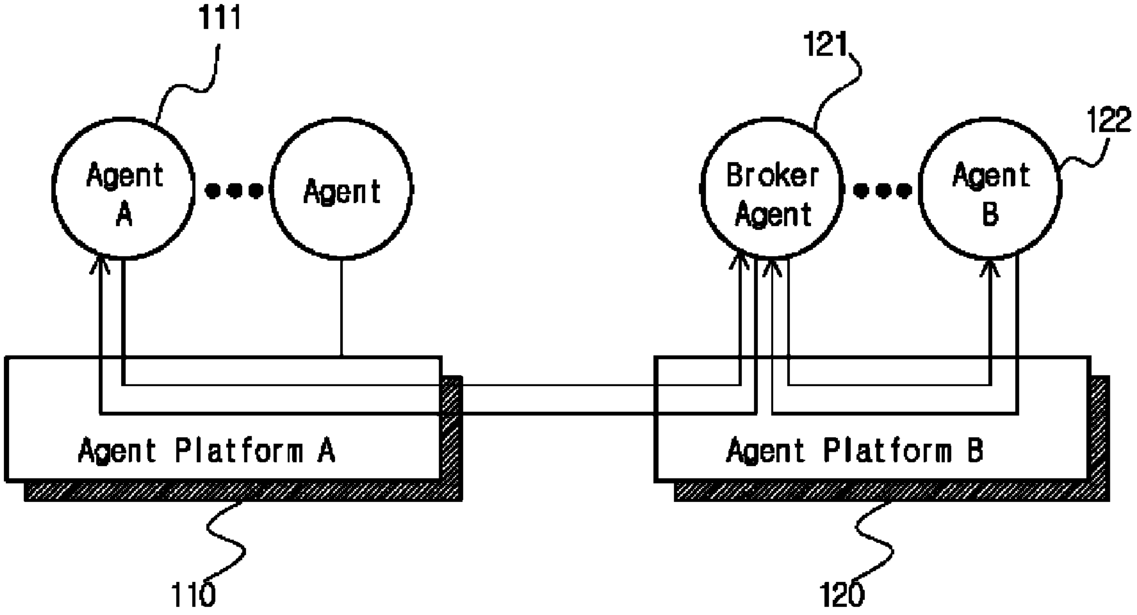
FIG. 1 is a block diagram illustrating a multi agent system transmitting/receiving a message through a broker agent according to the related art.
Figure 2:
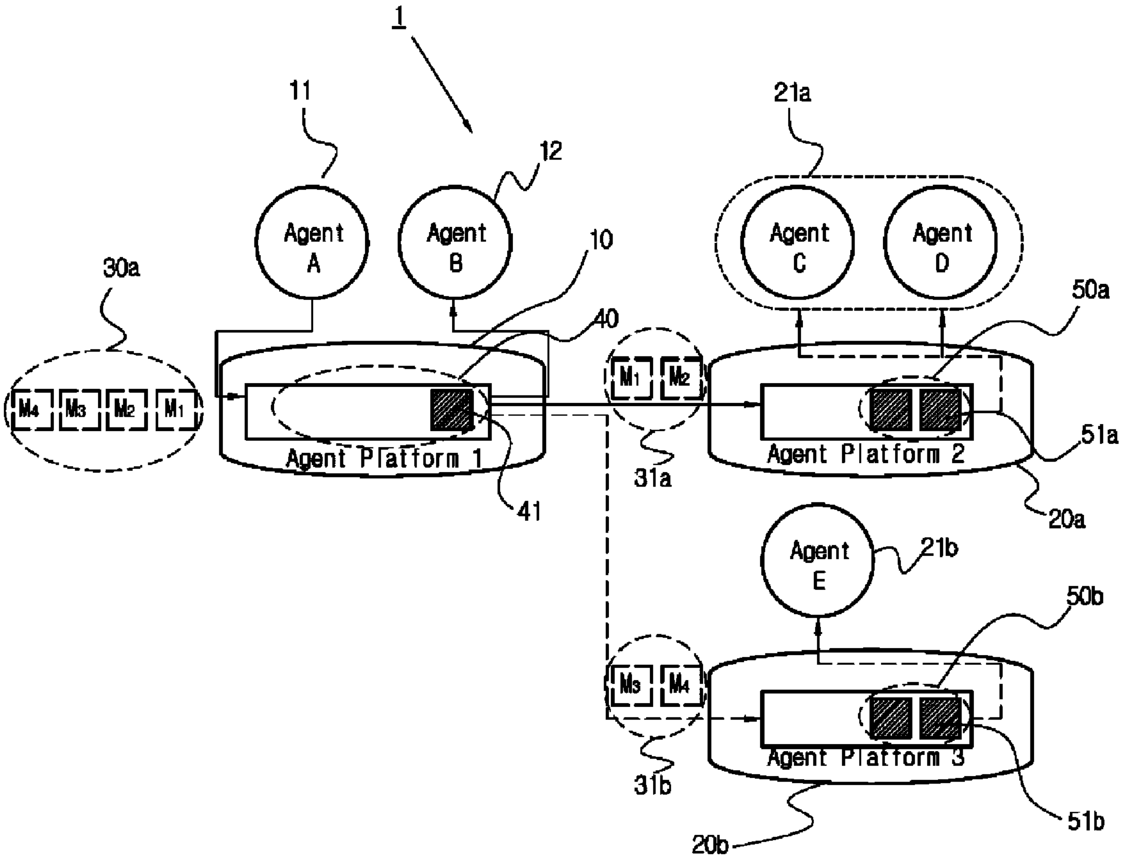
FIG. 2 is a block diagram illustrating a multi agent system assigning a priority at a first agent platform in accordance with an embodiment.

FIG. 2 is a block diagram illustrating a multi agent system 1 in accordance with an embodiment.

As shown in FIG. 2, the multi agent system 1 includes a first agent platform 10 having a first agent 11 and a second agent 12 and second agent platforms 20*a* and 20*b* having a plurality of agents 21*a* and 21*b*.

The first agent 11 transmits a message 30*a* and the first agent platform 10 receives the message 30*a* transmitted from the first agent 11. Here, the message 30*a* may be transmitted from the first agent 11 to the second agent 12 or the third agents 21*a* and 21*b*.

The first agent platform 10 transmits a message 30*a* to the second agent 12 or to the second agent platforms 20*a* and 20*b*. The second agent platforms 20*a* and 20*b* transmit the message 30*a* from the first agent platform 10 to the second agent 12.

In the present embodiment, the message is composed and processed according to the FIPA agent communication language (ACL).

Therefore, a method of transmitting a message from the first agent 11 to the second agent 12 includes a message receiving procedure, a priority assigning procedure, and a message transmitting procedure.

In the message receiving procedure, the first agent 11 transmits a message 30*a* to the second agent 12 and the third agents 21*a* and 21*b* at step S10 and the first agent platform 10 receives the message 30*a* transmitted from the first agent 11.

As shown in FIG. 2, messages transmitted from a plurality of first agents 11 are transmitted to the first agent platform 10 before transmitting to and being processed by the second agent platforms 20*a* and 20*b* having the third agents 21*a* and 21*b* or the second agent 12.

The priority assigning procedure includes steps S12 to S16 for assigning priorities to messages transmitted to the first agent platform 10.

Here, the priority is assigned to identify a transmission order of a message when a plurality of messages are sequentially transmitted.

The priority is assigned according to a type of a message 30*a*.

TABLE 2

| Patten of CAL | Communicative Acts |
|---|---|
| Directive | cancel, call for proposal, propagate, propose, proxy, query if, query ref, request, request when, request whenever, subscribe |
| Assertive | confirm, disconfirm, failure, inform, inform if, inform ref, not understood |
| Permissive (or prohibitive) | accept proposal, agree, reject proposal, refuse |

As shown in Table 2, the message 30*a* is classified into a directive message, an assertive message, and a permissive (or prohibitive) message.

The directive message includes a message for the first agent 11 to give an instruction to the second agent 12 or a message accompanying a reply message.

The directive message is a message transmitted from the first agent 11 to the second agent 12 or the third agent 21*a* and 21*b* for interaction. Therefore, the directive message requires the second agent 12 or the third agent 21*a* and 21*b* to response quickly.

Since it is impossible for the first agent 11 to predict an arrival time of a response message, which is transmitted from the second agent 12 or the third agent 21*a* and 21*b*, the first agent 11 does not perform any processes related to a previous message before the reply message is arrived. Such a way of processing the message may deteriorate the operational efficiency of the multi agent system 1.

The directive message may be classified into strong commitment. The directive message is related to the direction of the action involving a requestor or participants. In general, the requestor request and instructs and the participants instructs and proposes. The directive message has the highest priority among interactive messages because the directive messages are always accompanied by some actions.

As shown in Table 2, the directive message includes Cancel, Call for proposal, Propagate, Propose, Proxy, Query if, Query ref, Request, Request when, Request whenever, and Subscribe.

The Cancel means that an agent does not want to request another agent to perform a predetermined action any more, which was requested to perform by the agent. However, the Cancel is different from stopping or not performing the predetermined action any more. The Cancel means that an agent does not have any intention to another agent any more.

For example, the Call for proposal is a general action that starts negotiation for performing a given action.

The Propagate detects agents indicted by a descriptor given by a receiver and directly transmits a message to the detected agents.

The Propose is an action used for making a proposal or used for responding to a proposal during negotiation for performing an action for checking if a condition is true.

The Proxy transmits information to enable a sender agent to detect agents based on a descriptor given from a recipient agent and to enable a receiver to perform given communicative actions to agents.

As shown, the directive message is composed of a message for giving instructions or a message accompanying a reply message as an interactive message. Therefore, the directive message must have higher priority than any other messages. Except these communicative acts, Query if, Query ref, Request, Request when, Request whenever, and Subscribe are also messages for giving instruction or messages accompanying a replay message as an interactive message. The messages are well-known to those skilled in the art like ACL defined in FIPA. Therefore, detail descriptions thereof are omitted.

The assertive message is composed of messages for transmitting information from the first agent 11 to the second agent 12 or the third agent 21*a* and 21*b*. The assertive message is useful for accomplishing some aims of the communication. It concerns the delivery of explicit information or estimation on whether some action is right or wrong. The meaning of an assertive message may be seen as strong commitment or mediocre commitment because the assertive message transmits information, which the first agent 11 intends to transmit to, to the second agent 12 or the third agent 21*a* and 21*b*.

As shown in Table 2, the assertive message according to the embodiment includes Confirm, Disconfirm, Failure, Inform, Inform if, Inform ref, and Not understood.

For example, the Confirm is a message for a sender to prove that propose is a true when propose given from a receiver is not clear.

The disconfirm is a message for a sender to inform a receiver that a given propose is false when a receiver believes a given propose is true.

Each of the messages included in the assertive message has a priority higher than a permissive/prohibitive message. Since these messages of the assertive message are well-known to those skilled in the art like ACL defined by FIPA, the detail descriptions thereof are omitted.

The permissive/prohibitive message is a message for the first agent 11 to inform the second agent 12 or the third agent 21*a* and 21*b* of approval or disapproval for requests from the second agent 12 or the third agent 21*a* and 21*b*. The permissive/prohibitive message is used for deciding approval or disapproval. Therefore, the permissive/prohibitive message may be classified as weak commitment. Therefore, the permissive/prohibitive message is allocated with the lowest priority compared to the other messages.

At step S12, the first agent platform 10 assigns a priority to a message 30*a* transmitted from the first agent 11 according to the type of the message 30*a*, which described above.

Here, the same priority may be assigned to messages 30*a*. That is, if messages transmitted from the first agent 11 are all directive messages, the same priority is assigned to all of the messages 30*a*.

Then, if priorities to be assigned to all of the messages 30*a* are the same at step S13, the first agent platform 10 assigns a priority to the message 30*a* according to a transmitting/receiving frequency of the message 30*a* between the first agent 11 to the second agent 12 or the first agent 11 to the third agent 21*a* and 21*b* at step S14.

$$R_{(Agent_i),Agent_j)} = \begin{bmatrix} \text{null} & R_{12} & \cdots & R_{1j} \\ R_{21} & \text{null} & \cdots & R_{2j} \\ \cdots & \cdots & \text{null} & \cdots \\ R_{i1} & R_{i2} & \cdots & \text{null} \end{bmatrix} \quad \text{Eq. 1}$$

In Eq. 1, $R_{ij}$ denotes the number of message transmission from an agent i to an agent j.

The first agent platform 10 assigns a priority to a message 30*a* based on the transmitting/receiving frequency of messages between the first agent 11 and the second agent 12 or the third agent 21*a* and 21*b*, which is stored through Eq. 1. The transmitting/receiving frequency of messages between the first agent 11 and the second agent 12 or the third agent 21*a* and 21*b* is updated as the transmitting/receiving frequency of the message 30*a* increase.

Therefore, it is possible to prevent agents from being disabled to decide a transmission order when the same priority is assigned to all messages because the types of the messages are identical.

Even after performing the step S14, the same priority may be assigned to two or more messages 30*a* at step S15. In this case, a priority is assigned according to an order of transmitting messages from the first agent platform 10, thereby discriminating priorities of messages 30*a* at step S16.

As described above, the priorities are assigned according to the types of a message 30*a*, the transmitting/receiving frequency of a message 30*a* between agents, and the order of transmitting a message to the first agent 10 in the present embodiment.

After assigning a priority to a message 30*a*, the first agent platform 10 transmits messages 30*a* to the second agent 12 or the second agent platform 20*a* and 20*b* according to an assigned priority at step S17. The second agent 12 or the second agent platform 20*a* and 20*b* receives the message 30*a* transmitted from the first agent platform 10 at steps S18*a* and S18*b*.

As shown in FIG. 2, each of messages 30*a* is transmitted to the second agent platform 20*a* and 20*b* including the third agents 21*a* and 21*b* which are a final destination of the message 30*a*.

It is assumed that two of the second agent platforms 20*a* and 20*b* are provided as shown in FIG. 2, four messages M1, M2, M3, and M4 are transmitted from the first agent 11 to the first agent platform 10, and the priority order of the messages is assumed as M4>M2>M3>M1.

Under this assumption, the first agent platform 10 transmits the message M4 to the second agent platform 20*b* at first. Then, the first agent platform 10 transmits the message M2 to the second agent platform 20*a*. The first agent platform 10 transmits the message M3 to the second agent platform 20*b* and the message M1 to the second agent platform 20*a*. That is, the first agent platform 10 transmits the messages 30*a* to a plurality of second agent platforms 20*a* and 20*b* based on a priority assigned to the message 30*a*.

Continuously, two messages 31*a* including messages M1 and M2 are transmitted to the second agent platform 20*a* and two messages 31*b* including messages M3 and M4 are transmitted to the second agent platform 20*b*.

The second agent platforms 20*a* and 20*b* receive the messages 31*a* and 31*b* at step S18*a* and transmit the received messages 31*a* and 31*b* to the third agent 21*a* and 21*b* at step S19. Here, the second platform 201 may include more than two third agents 21*a* although the second agent platform 20*b* transmits the message 31*b* only to an agent E 21*b*. In this case, the second agent platform 20*a* sequentially transmits the messages 31*a* to the third agents 21*a* and 21*b* based on an order of receiving the messages. That is, between the messages M2 and M1 of the message 31*a* transmitted to the second agent platform 20*a*, the message M2 is transmitted first and the message M1 is transmitted later when the message 21*a* is transmitted to the third agents 21*a* and 21*b*.

The third agents 21*a* and 21*b* receive the messages 31*a* and 31*b* transmitted from the second agent platforms 20*a* and 20*b* at step S20.

The multi agent system 1 can transmit an urgent message first by enabling the first agent platform 10 to assign priorities to messages and transmit the messages according to the assigned priorities. Therefore, the operational efficiency of the multi agent system 1 may be improved.

Figure 4:
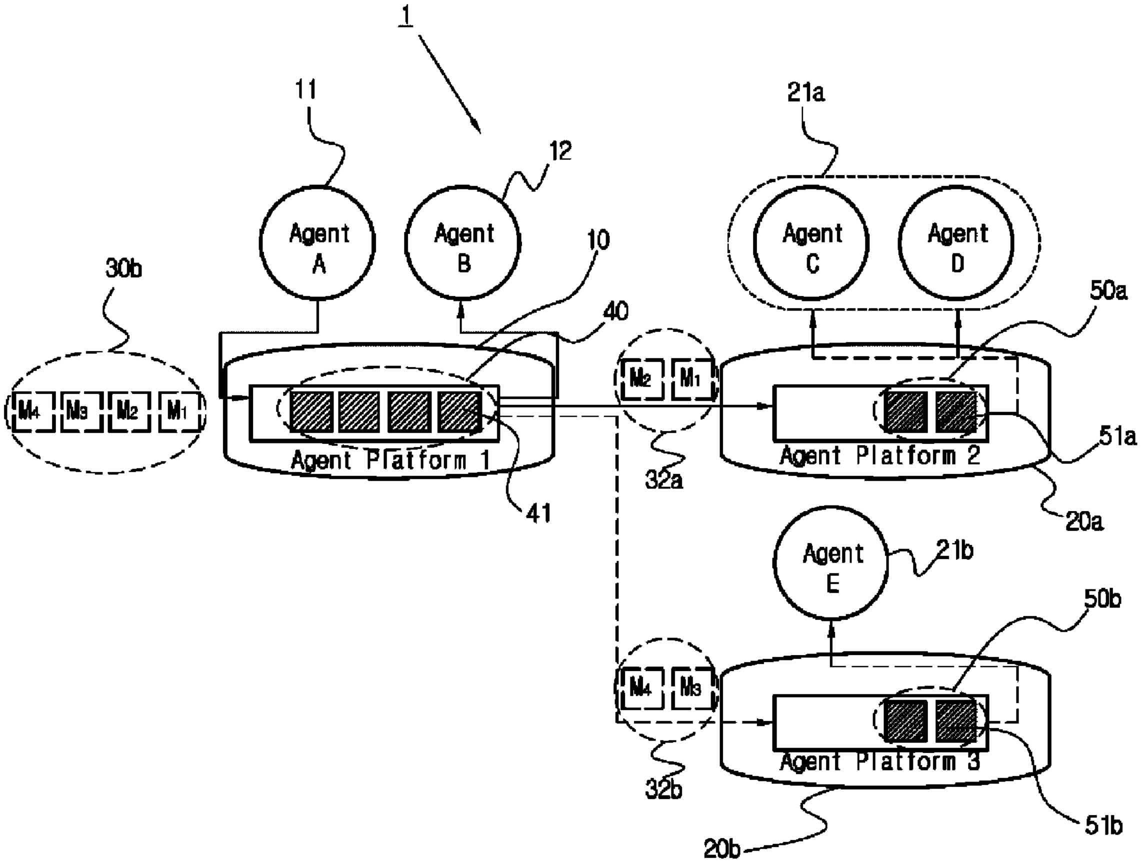
FIG. 4 is a block diagram illustrating a multi agent system assigning a priority at a second agent platform in accordance with an embodiment.

Although the first agent platform 10 can assign the priority to the message 30*a* as described above, the second agent platforms 20*a* and 20*b* may be enabled to assign priorities to the messages 32*a* and 32*b* as shown in FIG. 4.

For example, if the first agent platform 10 is processing previously received message when a message 30*a* is transmitted from the first agent 11 to the first agent platform 10, the first agent platform 10 must process the previously received message and then processes the message 30*a* transmitted from the first agent 11.

Here, a first message processing amount 40 denotes an amount of messages processed by the first agent platform 10 when the first agent platform 10 receives messages 30*a* and 30*b* from the first agent 11. Second message processing amounts 50*a* and 50*b* denote amounts of messages processed by the second agent platforms 20*a* and 20*b*. The first message processing amount 40 may be larger than the second message processing amounts 50*a* and 50*b*. In this case, it is more effective if the second agent platforms 20*a* and 20*b* assign priorities to messages rather than the first agent platform 10.

Figure 3:
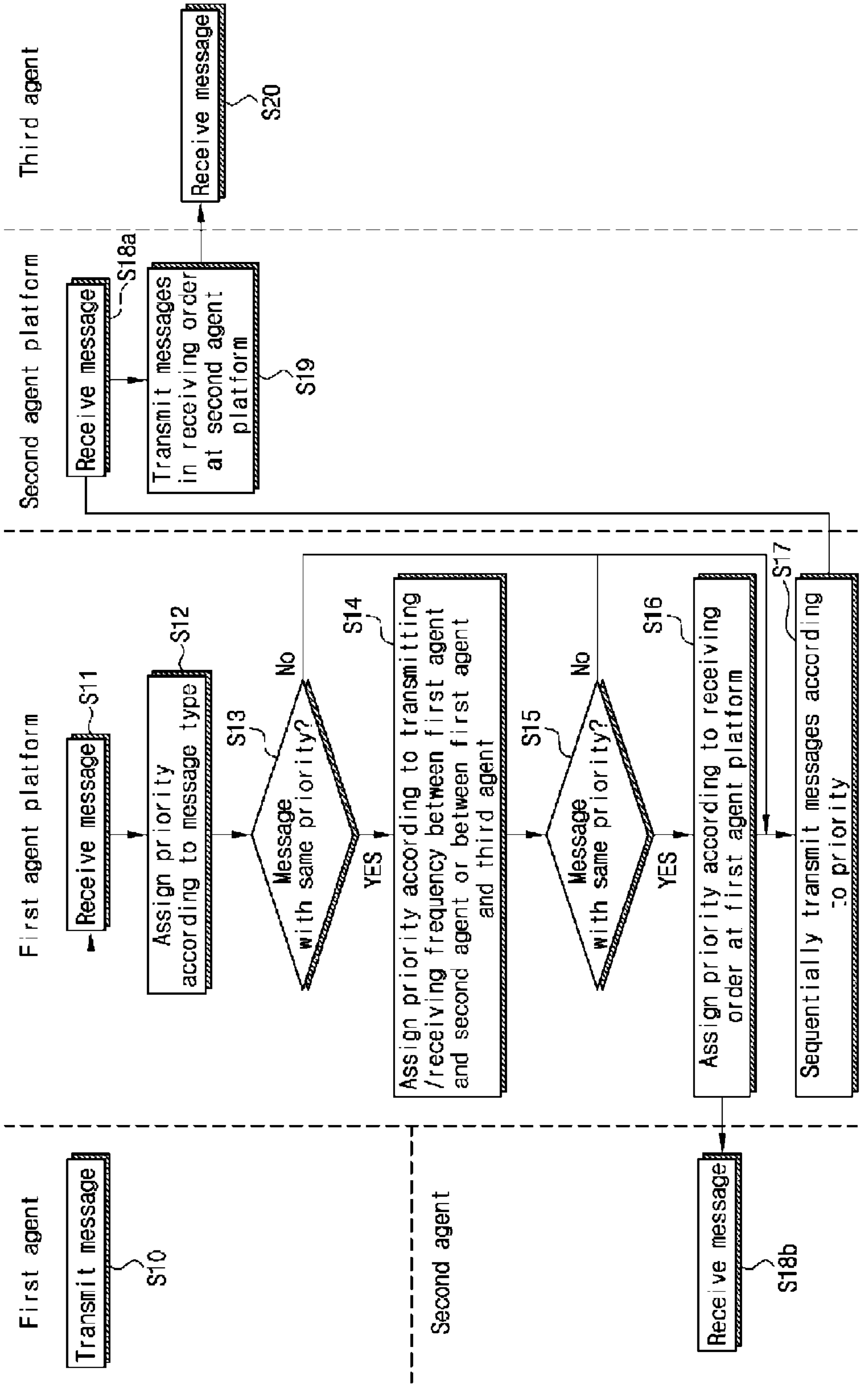
FIG. 3 is a flowchart showing operations of a multi agent system assigning a priority at a first agent platform in accordance with an embodiment.

If the first message processing amount 40 is smaller than the second message processing amounts 50*a* and 50*b*, it is more effective that the first agent platform 10 assigns priorities to messages according to the message type, the transmitting/receiving frequency, and the receiving order as shown in FIGS. 2 and 3.

As shown in FIG. 4, if the first message processing amount 40 is larger than the second message processing amounts 50*a* and 50*b*, the first agent platform 10 transmits messages 32*a* and 32*b* to the second agent 12 or the second agent platforms 20*a* and 20*b* according to the receiving order. Then, the second agent platforms 20*a* and 20*b* assign priorities to the messages 32*a* and 32*b* transmitted from the first agent platform 10 according to the message type, the transmitting/receiving frequency, and the receiving order, and transmits the messages 30*a* to the third agents 21*a* and 21*b* according to the assigned priorities.

That is, if the number 41 of messages belonging to the first message processing amount 40 is smaller than the numbers of messages 51*a* and 51*b* belonging to the second message processing amounts 50*a* and 50*b* as shown in FIG. 2, the first message processing amount 40 is smaller than the second message processing amounts 50*a* and 50*b*. In this case, the first agent platform 10 assigns priorities to the messages according to the method shown in FIG. 3 and transmits the message according to the assigned priorities. In this case, the messages 30*a* transmitted from the first agent 11 when the first message processing amount 40 is smaller than the second message processing amount 50*a* and 50*b* is referred as a first message 30.

However, if the number 41 of messages belonging to the first message processing amount 40 is larger than the numbers 41 of messages belonging to the second message processing amounts 50*a* and 50*b*, the first message processing amount 40 is larger than the second message processing amount 50*a* and 50*b*.

In this case, the second agent platforms 20*a* and 20*b* assign priorities to messages.

Hereinafter, a method of transmitting messages when the first message processing amount 40 is larger than the second message processing amounts 50*a* and 50*b* will be described with reference to FIGS. 4 and 5. Messages transmitted from the first agent 11 to the first agent platform 10 are referred as a second message 30*b*.

Figure 5:
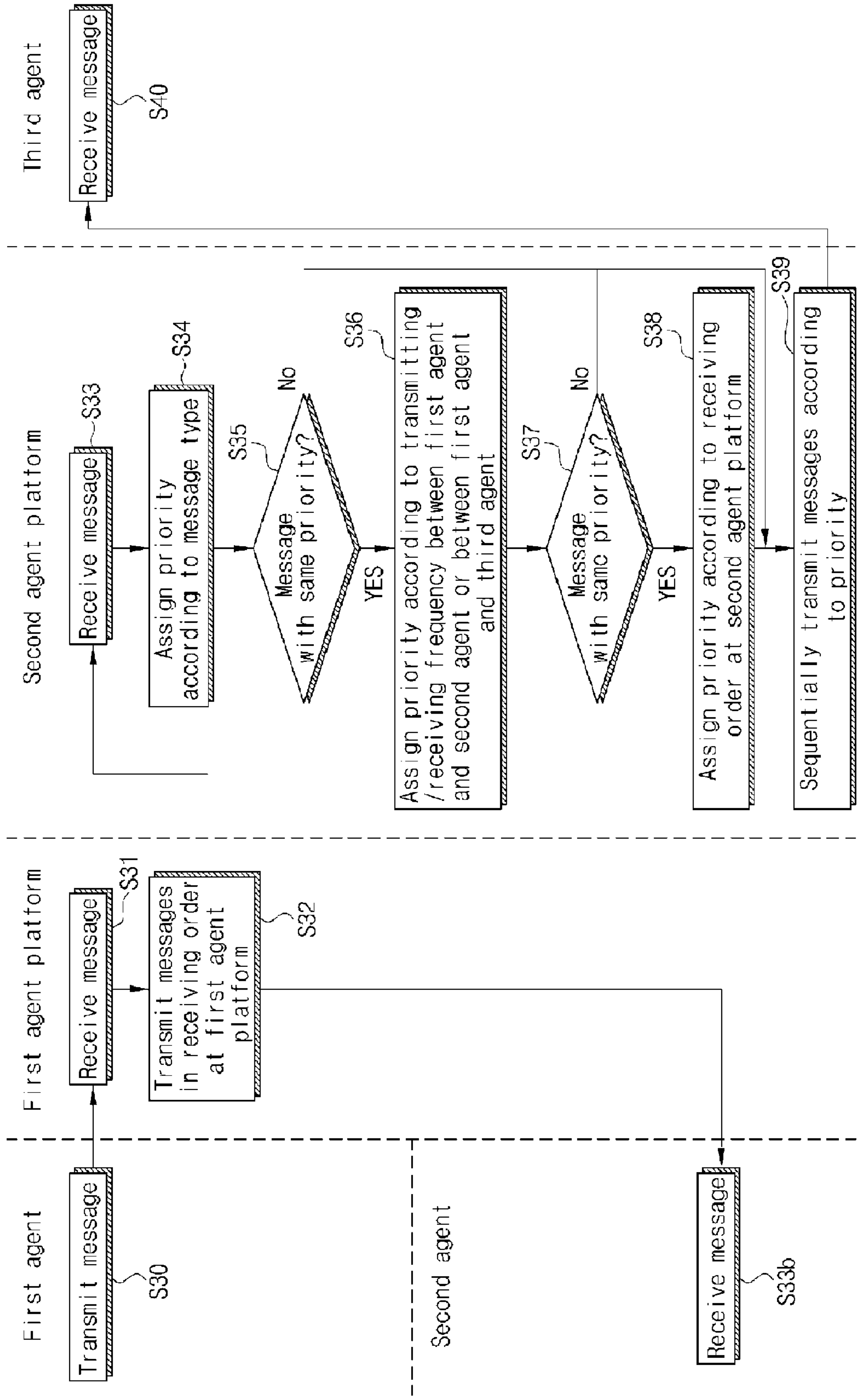
FIG. 5 is a flowchart showing operations of multi agent system assigning a priority at a first agent platform in accordance with an embodiment.

If the number 41 of messages belonging to the first message processing amount 40 is four and the numbers 51*a* and 51*b* of messages belonging to the second message processing amounts 50*a* and 50*b* are two as shown in FIG. 4, the first agent 11 transmits the second message 30*b* at step S30, the first agent platform 10 receives the second message 30*b* at step S31, and the second message 30 is transmitted to the second agent platform 20*a* and 20*b* or the second agent 12 according to a receiving order of the second message 30*b* received at the first agent platform 10 as shown in FIG. 5.

That is, if the second messages 30*b* are transmitted to the first agent platform 10 in an order of M1, M2, M3, and M4 as shown in FIG. 4, the first agent platform 10 transmits the second messages 30*b* to the second agent platforms 20*a* and 20*b* or the second agent 12 in the order of M1, M2, M3, and M4.

For example, it is assumed that the second messages 32*a* including messages M1 and M2 are transmitted to the third agent 21*a* belonging to the second agent platform 20*a*, and the second message 32*b* including message M3 and M4 are transmitted to the third agent 21*b* belonging to the second agent platform 20*b* as shown in FIG. 4.

In this case, the first agent platform 10 sequentially transmits the second messages 32*a* including the messages M1 and M2 to the second agent platform 20*a* at first. Then, the first agent platform 10 sequentially transmits the second messages 32*b* including M3 and M4 to the second agent platform 20*b*.

The second agent 12 receives the messages 32*a* and 32*b* from the first agent platform 10 at step S33*b*.

The second agent platform 20*a* and 20*b* receive the second messages 32*a* and 32*b* from the first agent platform 10 at step S33*a* and assigns a priority to the received messages according to the type of the second message 30*b* at step S34.

Since a method of assigning the priority based on the types of the second messages 32*a* and 32*b* at the second agent platforms 20*a* and 20*b* is identical to that performed at the first agent platform 10, which was described above, the detailed description thereof is omitted.

Like the first agent platform 10 assigning a priority to a message according to a type of a first message 30*a*, if the second messages 32*a* and 32*b* have the same priorities which were assigned according to the types of the second messages 32*a* and 32*b* at step S35, the second agent platforms 20*a* and

20*b* assigns a priority according to a transmitting/receiving frequency of messages transmitted and received between the first agent 11 and the second agent 12 or between the first agent 11 and the third agents 21*a* and 21*b* at step S36.

After the step S36, the second messages 32*a* and 32*b* may still have the same priorities at step S37. In this case, the priorities are assigned to the second messages 32*a* and 32*b* according to an order of transmitting the second messages 32*a* and 32*b* from the second agent platforms 20*a* and 20*b* in order to differentiate the priorities between the second messages 30*b* at step S38. Then, the second agent platforms 20*a* and 20*b* transmit the second messages 30*b* to the third agents 21*a* and 21*b* according to the priorities assigned to the second messages 30*b* at step S39, and the second agent 12 receives the second messages 32*a* and 32*b* from the second agent platform 20*a* and 20*b* at step S40.

Therefore, the multi agent system according to the present embodiment shortens a message processing time by assigning a priority to a message and selecting one of agent platforms to assign a priority based on a current message processing amount. Also, the multi agent system according to the present embodiment improves the efficiency thereof by firstly processing an important message such as a directive message which directly participates to an operation of an agent.

Hereinafter, a message processing time of the multi agent system according to the present embodiment will be compared with that of JADE with reference to Table 3 and FIG. 6.

At all of agents, messages are sequentially generated with a predetermined delay time. Therefore, an average processing time is obtained by dividing a total measured time by the number of transmitted messages.

Therefore, the average processing time may be an average time to transmit and receive messages.

The average processing time is measured while exchanging messages at two agent platforms including 100 agents. The agents are distributed at two agent platforms, and each of the agents transmits 10,000 messages.

TABLE 3

| Input message | The average processing time |
|---|---|
| Directive message (Strong commitment) | 0.109462 sec |
| Assertive message (Mediocre commitment) | 0.110571 sec |
| Permissive/prohibitive (Weak commitment) | 0.125919 sec |
| JADE | 0.118882 sec |

As shown in Table 3, in the first agent platform 10 or the second agent platforms 20*a* and 20*b* of the multi agent system according to the present embodiment, the average processing time for a directive message is about 0.109462 second and the average processing time for an assertive message is about 0.110571 second. The average processing times for the multi agent system are faster than an average processing time of JADE, which is about 0.118882 second. As shown, the multi agent system is more effective than JADE by firstly processing an important message participating directly to the operation of the agents such as reply or directive message.

Figure 6:
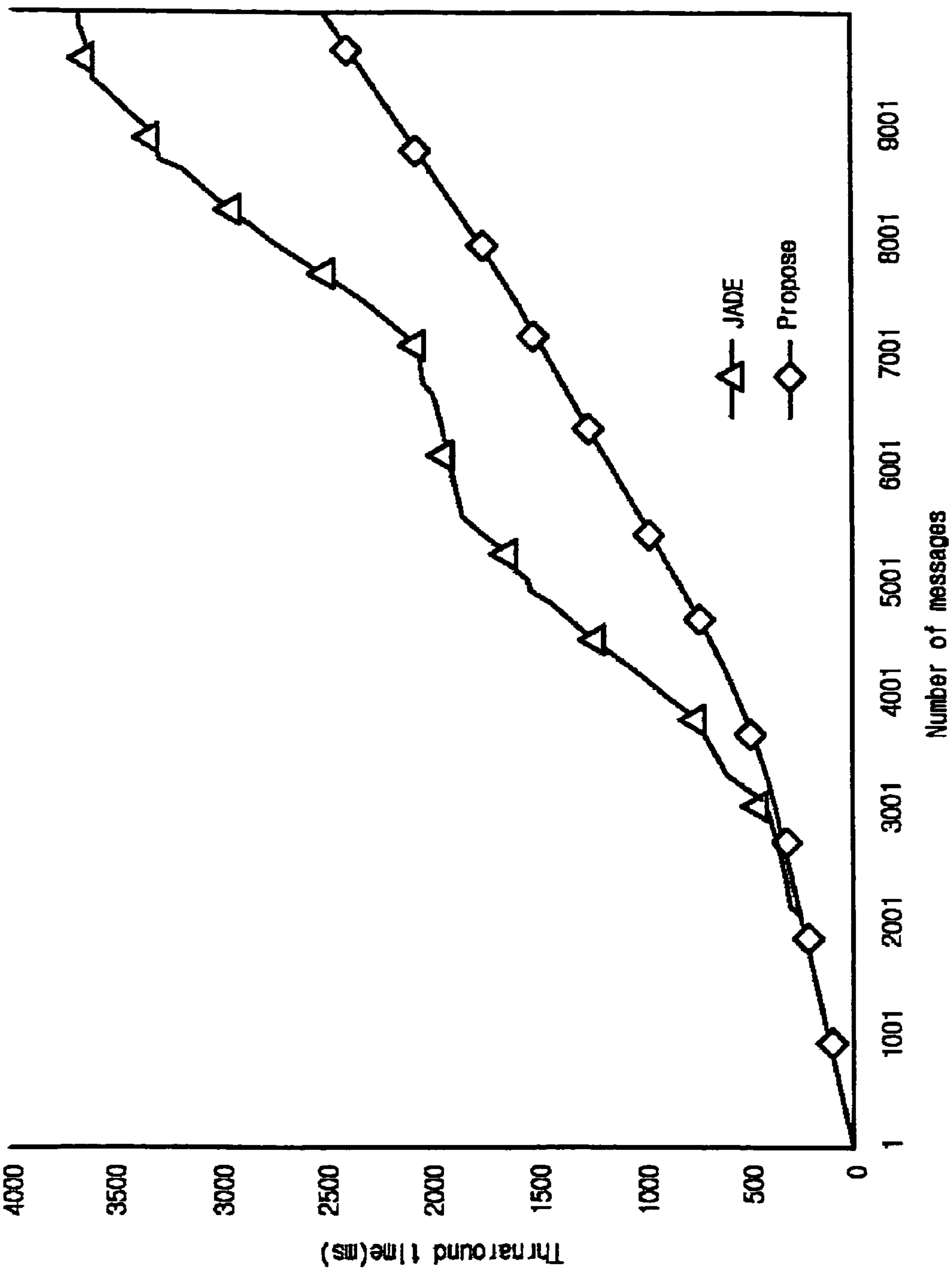
FIG. 6 is a graph for comparing a message processing time of a multi agent system according to an embodiment with that of JADE according to the related art.

FIG. 6 is a graph showing message processing times according to the number of messages at agent platforms of a multi agent system 1 and JADE.

As shown in FIG. 6, the graph clearly shows that the message processing time of the multi agent system (propose) is faster than that of JADE for processing the same number of messages. The graph also clearly shows that the more the number of message increases, the larger the difference between the message processing times between the multi agent system and the JADE becomes. The graph shows that the multi agent system 1 can process the same number of messages faster than JADE. That is, the graph shows the multi agent system is more effective than JADE.

As described above, the agent platform, the multi agent system, and the message transmitting and receiving method thereof according to the present embodiment can improve the operational efficiency of the multi agent system compared to JADE according to the related art by assigning a priority to a message and transmitting the message according to the assigned priority.

Also, the agent platform, the multi agent system, and the message transmitting and receiving method thereof can reduce the message processing time by selecting one of agent platforms according to a message processing amount of each agent platform.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

What is claimed is:

1. A message transmitting/receiving method for a multi agent platform including a first agent platform for managing at least one of a first agent and a second agent and at least one of a second agent platform for managing at least one of a third agent, comprising steps of:

a) at the first agent platform, receiving a plurality of messages from the first agent;

b) at the first agent platform, assigning a priority to the received message according to a message type of the message, and then for messages having identical priorities assigned according to the message type, assigning a higher priority to a message having a high transmitting/receiving frequency of a message transmitted between the first agent and the second agent or the first agent and the third agent than a message having a low transmitting/receiving frequency, and then for messages having identical priorities assigned according to the transmitting/receiving frequency and the message type, assigning a higher priority to a message received at first at the first agent platform than other message received later; and c) transmitting the message to the second agent or the second agent platform according to the priority, wherein the message is classified into:

a directive message accompanying with a message for giving an instruction to the second agent or the third agent by the first agent and a replay message;

an assertive message for the first agent to provide information to the second agent or the third agent;

a permissive/prohibitive message for the first agent to inform the second agent or the third agent of approval or disapproval, wherein in assigning the priority according to the message type in the step b), a higher priority is assigned in an order of the directive message, the assertive message, and the permissive/prohibitive message, and wherein the first agent platform includes a microprocessor performing the steps a), b) and c).

2. The message transmitting/receiving method of claim 1, wherein the message is composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

3. A message transmitting/receiving method for a multi agent platform including a first agent platform for managing at least one of a first agent and a second agent and at least one of a second agent platform for managing at least one of a third agent, comprising the steps of:

a) at the first agent platform, receiving a plurality of messages from the first agent;

b) comparing a first message processing amount, which is the quantity of messages under processing in the first agent platform at the time of the step a), and a second message processing amount, which is the quantity of messages under processing in the second agent platform at the time of the step a);

c-1) when the first message processing amount is smaller than the second message processing amount, at the first agent platform, assigning a priority to a message according to a message type of the message and then, for messages having identical priorities assigned according to the message type, assigning a higher priority to a message having a high transmitting/receiving frequency between the first agent and the second agent and between the first agent and the third agent, and then, for messages having identical priorities assigned according to the message type and the message transmitting/receiving frequency, assigning a higher priority to a message received earlier at the first agent platform than a message received later;

c-2) transmitting messages sequentially to the second agent or the second agent platform according to the priority assigned in the step c-1);

d-1) when the first processing amount is larger than the second processing amount, transmitting the messages to the second agent or the second agent platform based on an order of receiving the messages at the first agent platform;

d-2) at the second agent platform after receiving the messages by the step d-1), assigning a priority to the messages transmitted from the first agent platform based on the message type, and then, for messages having identical priorities assigned according to the message type, assigning a higher priority to a message having a high transmitting/receiving frequency between the first agent and the third agent, and then, for messages having identical priorities assigned according to the message type and the message transmitting/receiving frequency, assigning a higher priority to a message received earlier at the second agent platform than a message received later; and d-3) sequentially transmitting the messages according to the priority assigned in the step d-2) to the third agent, wherein the message is classified into:

a directive message accompanying with a message for giving an instruction to the second agent or the third agent by the first agent and a replay message;

an assertive message for the first agent to provide information to the second agent or the third agent;

a permissive/prohibitive message for the first agent to inform the second agent or the third agent of approval or disapproval, wherein in assigning the priority based on the message type in the steps c-1) and d-2), a higher priority is assigned in an order of the directive message, the assertive message, and the permissive/prohibitive message, wherein each of the first and second agent platforms includes a microprocessor performing the steps a), b), c-1), c-2), d-1), d-2) and d-3).

4. The message transmitting/receiving method of claim 3, wherein the message is composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

5. A multi agent system having a plurality of agent platforms, comprising:

a first agent platform for managing at least one of a first agent and a second agent, receiving messages from the first agent, and transmitting the message to the second agent or another agent platform; and a second agent platform for managing at least one of a third agent and transmitting a message transmitted from the first agent platform to the third agent;

wherein a microprocessor of the first agent platform assigns a priority to the message according to a message type of the message and transmits the messages sequentially to the second agent or the second agent platform according to the assigned priority, and then when there are messages having identical priorities assigned according to the message type, assigns a higher priority to a message having a high transmitting/receiving frequency of a message transmitted between the first agent and the second agent or the first agent and the third agent than a message having a low transmitting/receiving frequency, and then when there are messages having identical priorities assigned according to the transmitting/receiving frequency and the message type, assigns a higher priority to a message received at first at the first agent platform than other message received later, wherein the second agent platform assigns a priority to the messages in an order of receiving the messages and sequentially transmits the messages to the third agent according to the assigned priority, wherein the message is classified into:

a directive message accompanying with a message for giving an instruction to the second agent or the third agent by the first agent and a replay message;

an assertive message for the first agent to provide information to the second agent or the third agent;

a permissive/prohibitive message for the first agent to inform the second agent or the third agent of approval or disapproval, wherein in assigning a priority according to the message type at the first agent platform, and a higher priority is assigned in an order of the directive message, the assertive message, and the permissive/prohibitive message.

6. The multi agent system of claim 5, wherein the message is composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

7. A multi agent system having a plurality of agent platform, comprising:

a first agent platform for managing at least one of a first agent and a second agent, receiving messages from the first agent, and transmitting the messages to the second agent or another agent platform, the first agent platform being controlled by a microprocessor included therein; and a second agent platform for managing at least one of a third agent, and transmitting the messages transmitted from the first agent platform to the third agent, the second agent platform being controlled by a microprocessor included therein, wherein, when a first message processing amount, which is the quantity of messages under processing in the first agent platform at the time the first agent platform receives said messages from the first agent, is smaller than a second message processing amount, which is the quantity of messages under processing in the second agent platform at the time the first agent platform receives said messages from the first agent, the first agent platform assigns a priority to the messages transmitted from the first agent according to a message type of the messages and transmitting the messages to the second agent or the second agent platform, and the second agent platform transmits the messages transmitted from the first agent platform to the third agent according to an order of transmitting the messages, and then, for messages having the same priority assigned according to the message type, the first agent platform assigns a higher priority to a message having a high transmitting/receiving frequency between the first agent and the second agent or between the first agent and the third agent, and then, for messages having identical properties assigned according to the message type and the transmitting/receiving frequency, the first agent platform assigns a higher priority to a message received earlier at the first agent platform than a message received later, and wherein, when the first processing amount is larger than the second processing amount, the first agent platform transmits the messages transmitted from the first agent to the second agent or the second agent platform according to an order of transmitting the messages at the first agent platform and the second agent platform assigns a priority to the messages transmitted from the first agent platform according to a message type of the messages and sequentially transmits the messages to the third agent according to the assigned priority, and then, for messages having the same priority assigned according to the message type, the second agent platform assigns a higher priority to a message having a high transmitting/receiving frequency between the first agent and the second agent or between the first agent and the third agent for messages having the same priority assigned according to the message type, and then, for messages having identical properties assigned according to the message type, the second agent platform assigns a higher priority to a message received earlier at the first agent platform than a message received later for messages having identical properties assigned according to the message type, wherein the message is classified into:

a directive message accompanying with a message for giving an instruction to the second agent or the third agent by the first agent and a replay message;

an assertive message for the first agent to provide information to the second agent or the third agent;

a permissive/prohibitive message for the first agent to inform the second agent or the third agent of approval or disapproval, wherein in assigning a priority according to the message type at the first and second agent platforms, a higher priority is assigned in an order of the directive message, the assertive message, and the permissive/prohibitive message.

8. The multi agent system of claim 7, wherein the message is composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

9. An agent platform for managing a plurality of agents, each having a microprocessor, wherein the agent platform, controlled by the microprocessor, receives a plurality of messages from a first agent, assigns priorities to the received messages according to a message type thereof, and sequentially transmits the messages to a second agent according to the assigned priority, wherein, for messages having identical priorities assigned according to the message type, a higher priority is assigned according to a high transmitting/receiving frequency between the first agent and the second agent, wherein, for messages having identical priorities assigned according to the message type and the transmitting/receiving frequency, a higher priority is assigned to a message received earlier at the agent platform than a message received later, wherein the message is classified into:

a directive message accompanying with a message for giving an instruction to the second agent or the third agent by the first agent and a replay message;

an assertive message for the first agent to provide information to the second agent or the third agent;

a permissive/prohibitive message for the first agent to inform the second agent or the third agent of approval or disapproval, wherein in assigning a priority according to the message type at the first and second agent platforms, a higher priority is assigned in an order of the directive message, the assertive message, and the permissive/prohibitive message.

10. The agent platform of claim 9, wherein the message is composed based on an agent communication language (ACL) defined in a foundation for intelligent physical agents (FIPA), the directive message includes Cancel, Call for proposal, Propagate, Propose, Proxy, Query if, Query ref, Request, Request when, Request whenever, and Subscribe, where are defined in the ACL, the assertive message includes Confirm, Disconfirm, Failure, Inform, Inform if, Inform ref, and Not understood, where are defined in the ACL, the permissive/prohibitive message includes Accept proposal, Agree, Refuse, and Reject proposal, which are defined in the ACL.

* * * * *